Aug. 25, 1964 G. J. LAURER 3,146,423

TIMING CIRCUIT

Filed June 29, 1959 2 Sheets-Sheet 1

INVENTOR
GEORGE J. LAURER

BY William K. Barrett Jr.

ATTORNEY

United States Patent Office 3,146,423
Patented Aug. 25, 1964

3,146,423

TIMING CIRCUIT

George J. Laurer, Johnson City, N.Y., assignor to International Business Machines Corporation, New York, N.Y., a corporation of New York Filed June 29, 1959, Ser. No. 823,671
5 Claims. (Cl. 340—172.5)

The present invention relates to data input device for a cyclic storage device and in particular to apparatus for sensing a record medium containing data at successive locations and storing the same on a cyclic storage device at predetermined locations.

In a record card input to a rotating magnetic drum such as the particular embodiment utilizes, there are a plurality of unique digit locations located around the periphery of the drum which are available for data entry from the card into this location once for each rotation of the drum. For the record card, each row of information represents a particular value when there is a hole punched therein and each column of the card represents a character or a digit which will be placed at some predetermined digit location on the rotating drum. With a drum rotating at a given speed X r.p.m. with each digit place on the drum being available in a time $$\left(\frac{1 \text{ minute}}{X \text{ revolutions}}\right)$$

it is seen that this is the minimum time which can be taken by the sensing of a row and the space between adjacent rows (called a cycle point) because of the fact that a different row will present the same problem of entering data from all columns to all digit locations. With a card having 12 cycle points plus 4 cycle points for the space between cards, the maximum rate for entering data directly into a rotating magnetic drum is:

$$16\left(\frac{1 \text{ minute}}{X \text{ revolutions}}\right) \text{ or } \frac{\text{time}}{\text{per card}}$$

inverting:

$$\frac{\text{Cards}}{\text{Time}}=\frac{X \text{ revolutions}}{16 \text{ (1 minute)}}$$

This is of course the worst possible case in that this would be where the entire periphery of a drum is to be used or where only a portion of the drum is to be used and the data is available after the beginning of the group so that it is necessary to wait for the next revolution of the drum. Since the worst possible case occurs periodically, the design of apparatus must necessarily use this as a limiting specification. Further, it should be noted that this rate does not take into consideration the tolerances which are necessary on any machine. With the various mechanical and electrical elements used, time must necessarily be allowed for the operation of these elements aside from their normal operating time.

If the area of the punch is used solely, which is one-half the length of the cycle point, it is seen that a brush contact will generate a pulse which is only half as long as necessary if the maximum drum speed is to be utilized in the storage of the data. Consequently, with machines which use this approach, it is necessary to cut the card reading speed to approximately one-half of what the maximum input would be if the entire time of the cycle point could be used.

Other approaches besides the present have been used to achieve this maximum speed, one of which is provided an overlap in reading and transmitting data to the drum. In this type of system, the image of information from the brushes is read and stored for a complete cycle point to thus use all the available time in a cycle point. The disadvantage with this approach is in the additional cost of the additional storage equipment.

It is therefore an object of this invention to provide an improved data input device for a cyclic storage device in which the rate of data flow is a maximum for the particular revolution rate of the cyclic storage device.

It is a further object of the present invention to provide an apparatus for sensing a record medium containing data at successive locations and storing the same on a cyclic storage device at a rate which is a maximum for the rotation of said cyclic storage device.

It is another object of the present invention to provide an apparatus for sensing a record card containing rows of data as punched holes therein and storing the sensed data on a storage medium having cyclically available areas for storage wherein the time in which a row of data from a record card may be read is substantially the time which it takes for the storage area to make a complete revolution.

The foregoing and other objects, features and advantages of the invention will be apparent from the following more particular description of a preferred embodiment of the invention, as illustrated in the accompanying drawings.

Before proceeding with an explanation of the circuit for implementing the present invention, the invention will be explained with reference to the timing chart of FIG. 2, Row A, which is the row pulses for a card, originates from a master circuit breaker 13, FIG. 1, which closes once for each cycle point and at a time which concurs with the sensing of each row. Row B is the time occurrence of the drum buffer sector into which information is to be stored in relation to the row pulse from which the information to be read in is to be obtained. The time span of this sector is shown in exaggerated length in comparison with the showing in FIG. 1. The speed of card reading is illustrated at approximately 90% of the maximum.

At a point marked R, readin, on each row pulse, any information contained in that row would be read into a buffer storage 20 of magnetic cores 21 equal in number to the columns of a card to be read. When the scan period or occurrence of that area of the drum on which information is to be recorded in beneath the recording head, the information contained in the buffer storage is read into the drum.

The time of each row pulse, numbered R9–R3 for this illustration, and the time occurrence of the proper drum sector are such that for rows R9–R6 and sector SO1–SO4 there is no problem in that each row is read and stored in buffer storage and subsequently transferred to the next occurring sector. The time for transfer into magnetic cores and the time for transfer out of these cores is so minute as to be negligible and so has not been calculated. However, for row R5, the readin to the row buffer of cores overlaps into the availability of the sector time SO5 so that it will be necessary to wait for the sector to come around again. At this time it can be seen that the row pulse R4 substantially overlaps the sector at SO6 time and it is necessary that no readin to buffer storage be made before a complete transfer has been made at SO6 time of the information from row R5. With reference to the row pulse time R4, it is seen that readin to the buffer cores must be accomplished at substantially the end of the row pulse time since row R5 is being read in to buffer storage at the first part of SO6 time. The operation then continues as before.

Figure 1:
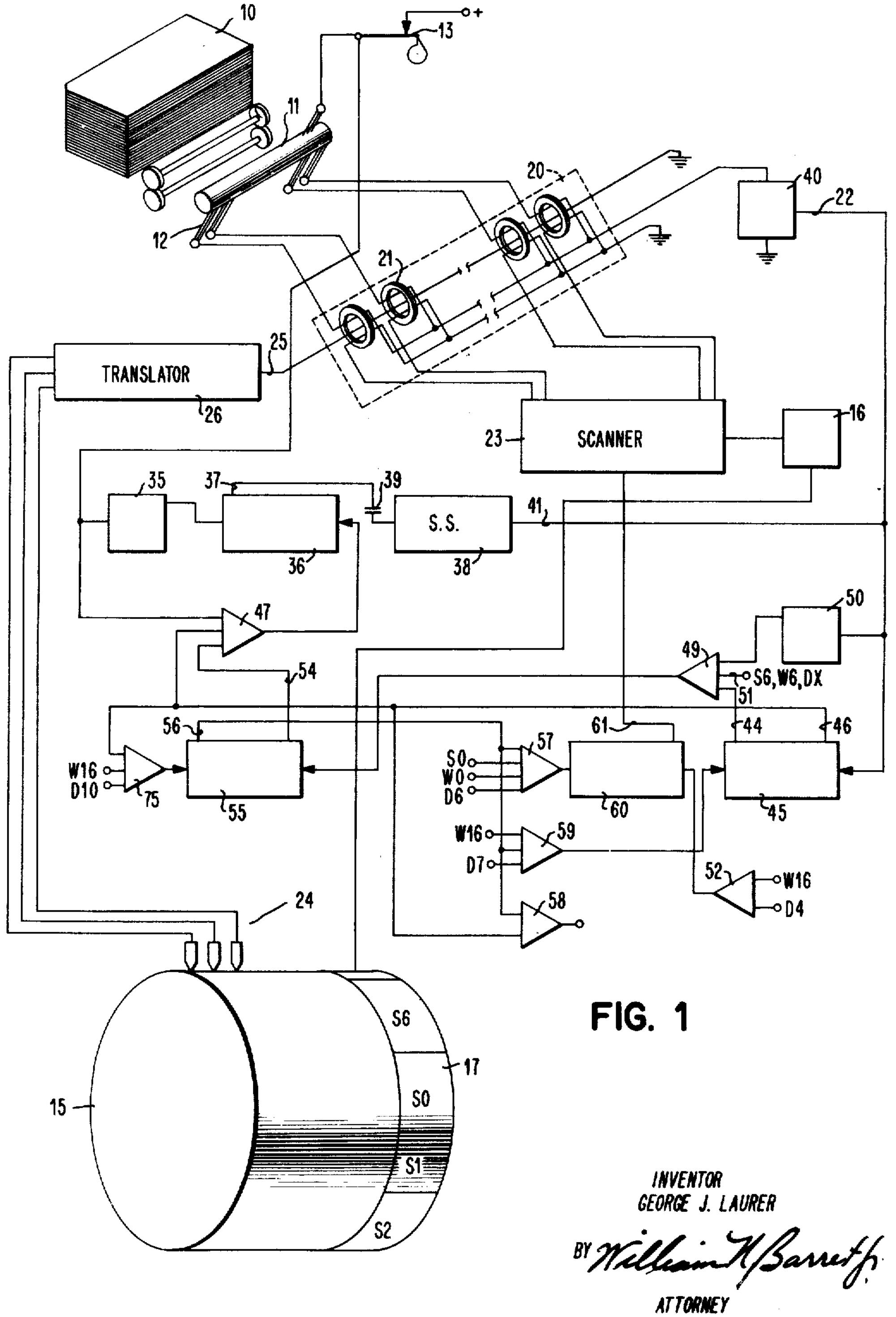
FIG. 1 is a schematic illustration of the invention.
Figure 2:
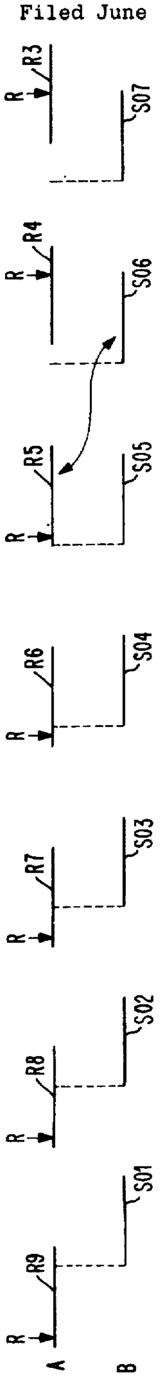
FIG. 2 is a timing chart.
Figure 4:
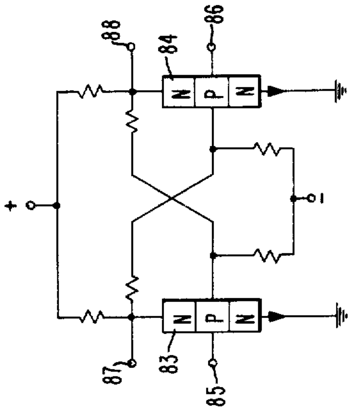
FIGS. 3 and 4 are circuit diagrams of two elements shown in FIG. 1.
Figure 3:
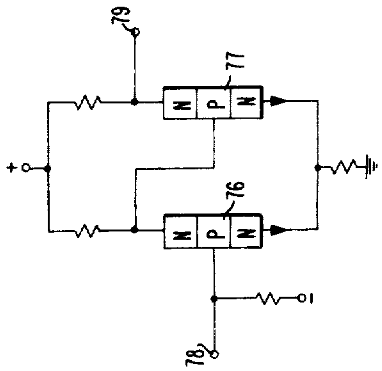

The components shown in the schematic circuit of FIG. 1 are not illustrated particularly except for a single shot, FIG. 3, and a trigger, FIG. 4, since the particular construction of the same is of no particular interest to the present invention. Each, however, may be found in the prior art and enough description will be given with reference to each to amply identify its essential characteristics. These components are generally OR circuits shown as half moons; AND circuits shown as triangles; and inverters shown as squares except where otherwise indicated. The OR circuits pass any positive pulse which appears on an input; the AND circuits need positive pulses on all inputs before the output will rise and the inverter inverts positive voltage levels to a lower voltage level and vice versa. It is of course immaterial as to the type of circuit elements used although in this case the components were transistorized. For the logic blocks, vacuum tubes or diode implementation is also permissible.

A card 10 containing eighty columns and twelve rows of possible punched hole positions is passed through a sensing station 11 containing 80 brushes 12 or other sensing means making contact through each possible hole to a conducting contact roll 13 located beneath the card. For switching purposes a master circuit breaker 13 closes in time with the passage of each row of possible punched holes beneath the sensing means and would in the ordinary case complete the circuit through the brushes to read in to whatever device is connected thereto. In the present invention the master circuit breaker 13 is used for timing but another unit 40 is utilized for completing the circuit through a row of magnetic cores 20 when the contact roll has potential applied thereto.

The current through a brush 12 is passed through an associated magnetic core 21 and sets the same if a circuit element 40 is then conducting to complete the circuit to ground. The circuit element 40 is a tube or power transistors in parallel operated by a signal on line 22 to cause conduction. The line 22 would be to the grid of a tube or the bases of NPN transistors to condition the same for conduction. Other circuit implementation such as diodes, relays, etc., is also permissible if the parameters of operation time fulfill the necessary timing consideration of the invention.

If the circuit is completed through the cores 21 and the circuit closing element 40, the cores will be set to a first state if there is a hole in that particular column and that particular row. If no hole is present, the associated core 21 will remain in its reset state. The scan and transmit circuit 23 which is timed by circuit 16 attempts to reset each core successively by column as the area of drum 17 in which this information is to be recorded passes beneath recording heads 24. If the individual core 21 has been set by a hole in the card for that row, it will of course be reset by circuit 23 and a pulse will be generated on output winding 25. This pulse is connected into a translator circuit 26 which codes the pulse for its row position by energizing one or more of the recording heads 24. This preceding operation is explained in more detail in application Serial No. 823,747 to G. J. Laurer et al. entitled Data Input Device.

A magnetic drum 15 is illustrated with the various sectors S0, S1, etc., shown as the timing tracks 17 for furnishing pulse data to a timing circuit 16 as to that portion of the drum passing beneath the recording heads. The timing circuit 16 is not shown in detail, but reference is made to the above application to G. J. Laurer et al. for a description of the same. In other portions of the circuit, lines will have indicated thereon particular timing designations obtained from the timing tracks 17. While the particular sector in which the recording is to take place is not important with respect to the invention, the logic has been shown with appropriate signals for sector S0 which contains sixteen words, W0–W16. The digits of a word are DX, D0, D1–D10 with DX and D0 used for timing and sign. Word W0 is left blank and words W1–W16 are used for data.

The timings shown opposite the various logic blocks of the circuit are the ones actually used and therefore must be adjusted for the various delays encountered in the circuit. While this may be somewhat confusing, it is believed that the showing of the drum positions as timing signals would not be justified. The timing signals are related to the place of recording by different amounts and are generally about seven digit places prior to the time the desired drum location reaches the recording heads. These timings will obviously be adjusted to fit the particular circuitry used and are not critical to the practice of the present invention.

For the purpose of explaining the present invention, the initial state of the apparatus will be assumed to be one in which the core buffer 20 has just been read by circuit 23 and the contents stored on drum 15. In this condition all circuits elements will be reset as will be explained subsequently.

As the next row of information on the card 10 passes beneath the sensing brushes 12 the circuit breaker 13 will close and furnish potential to the contact roll 11 and to AND circuit 47 which at that time will have raised inputs on all lines. The AND circuit 47 provides a positive pulse to set the trigger 36. The output 37 of the stage which goes OFF has a positive going pulse reflected across isolation capacitor 39 to set the single shot 38 which has a recovery time of one millisecond. When the single shot 38 is set the output 41 goes up and sets the latch or trigger 45 with the output 44 in a raised voltage condition and with the output 46 in a lowered voltage condition. This trigger 45 will be referred to as a scan interlock and prevents by way of lowered output 46 to AND 47 the resetting of trigger 36 for another row pulse before the preceding information has been read onto the drum. The output 44 with raised voltage is coupled to an AND 49. An inverter 50 is connected to the output 41 of single shot 38 and will have a raised voltage when the single shot 38 resumes its normal condition in approximately one millisecond.

A further input 51 to AND 49 is a timing line which has a pulse thereon prior to the desired sector for recording. The timing is a number of words prior to sector S0, W1 to insure stable conditions in the readin of information to the core buffer 20. When this line 51 goes up, the output of AND circuit 49 goes up and sets a scan trigger 55 which by a raised output 56 conditions AND circuits 57–59. The AND 57 controls a trigger 60 which by an output 61 controls the scan of the information from core storage to the drum by a circuit 23 when the particular location pulses appear from timing circuit 16. In the above-mentioned copending application, the trigger 60 would control the ground connection shown as "62" in that application to prevent the setting of a core "61" as shown therein until trigger 60 has been set. While the trigger 60 is shown as the circuit element, it would be appropriate to use a higher current capacity tube as mentioned in relation to element 16 for providing a current return to ground.

The AND circuit 57, when the appropriate timing signals appear, will set the trigger 60. As mentioned previously there is a seven digit delay so that the timings S0, W0, D6 would correspond to an ON time rating S0, W1, D1, while the reset shown by way of an AND circuit 52 with timings W16, D4 would be the first digit place of the next sector. The trigger, therefore, is set for the desired recording interval by the raised input of AND 57 and the input from AND 52 to reset the same.

As mentioned previously once the trigger 36 has been set by the output from AND circuit 47, the trigger 45 will maintain one input to AND 47 in a low voltage condition to prevent the next succeeding row pulse from circuit breaker 13 from actuating trigger 36 until the preceding row of information contained in buffer 20 is read onto drum 15. The output 54 of trigger 55 is also in a low voltage condition. The trigger 36 is reset by the circuit breaker 13 breaking the circuit to inverter 35 which by the positive pulse will reset trigger 36.

After the row of information stored in buffer 20 has been read onto the drum 15, the various circuit elements are reset. For trigger 45, the AND circuit 59 provides a reset after word W16 has passed, remembering that these times are prior to ON time readings while trigger 55 is reset by AND 75 which has as one of its inputs, the output 46 of trigger 45 which is high when trigger 45 is reset. The AND 58 provides an output to reset all elements which must be reset in the circuit not otherwise having a separate reset.

The circuit therefore provides for a selective readin of information to the core buffer 20 by means of ground connector 40 for each row of the card 10 when the circuit breaker 13 closes, if the previous row of information has been read out to the drum 15. If the buffer 20 still contains the information from a previous row, the element 40 is prevented from conduction by the AND circuit 47. Once however the sector into which information is to be placed has passed beneath the recording heads 24, the AND circuit 47 is enabled and the element 40 conducts to read the next row of information.

The circuit elements of FIGS. 3 and 4 are transistorized single shots and triggers respectively. The circuit of FIG. 3 consists of two transistors 76 and 77 arranged as shown. When a positive pulse appears at input 78 the transistor 76 generates a lowered potential at its collector for the duration of the input pulse to form a negative pulse which drives the transistor 77 to obtain a positive pulse at the output. When the pulse at terminal 78 terminates, the output at terminal 79 drops to terminate the output pulse.

The trigger of FIG. 4 comprises two NPN transistors 83 and 84 having inputs at 85 and 86. When a positive going pulse is applied at input 85 or 86 the collector of this transistor will have a lowered voltage to bias the opposite transistor to obtain a raised voltage output on its collector. These states are stable and remain thus until reset by a properly oriented pulse. The inputs and outputs of the logic blocks of FIG. 1 are shown with the operation of a trigger as in FIG. 3.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination, sensing means for rows of data available successively in equal increments of time for a fractional period of said increment contained in a record card, a data storage device containing a plurality of data storage locations successively available for storage of said input data and having an access time greater than the time during which said row of data is available, a buffer storage responsive to said sensing means for reading the data contained in said card for transmission to said data storage device, a signal means operable during each successive row to provide a signal indicative of the presence of said row of data manifestations and means connected to said signal means and responsive to a signal and the transmission of said data from said buffer storage to said storage device for enabling said buffer storage to accept the data from the next successive row.

2. The apparatus of claim 1 in which said signal device and said enabling means are connected in circuit to complete the same when both are operative.

3. The apparatus of claim 2 in which said enabling means includes readin means, setting means for selectively connecting said signal means to said readin means to set the same, means responsive to said signal means for resetting said readin means, scan means operated by said readin means when said readin means is set by said signal means for conditioning said buffer storage for the transmittal of information during a predetermined period and means responsive to the termination of said predetermined period for resetting said scan means and said setting means to allow the succeeding row of information to be entered.

4. The apparatus of claim 3 wherein said data storage device includes a rotating storage drum wherein the information from said buffer storage is read onto said rotating storage drum at a predetermined period according to the desired recording area.

5. In combination, a sensing device for successive periodic input data manifestations available in equal increments of time for a fractional period of said increment, a data storage device containing a plurality of data storage locations successively available for storage of said input data and having an access time greater than the time during which said manifestations are available, a buffer storage for selectively accepting said data manifestations from said sensing means for transmission to said data storage device, means to provide a signal indicative of the presence of said data manifestations, and means connected to said signal means and responsive to a signal and the transmission of said data from said buffer storage to said storage device for enabling said buffer storage to accept the next successive data manifestations, said enabling means for said buffer storage including means operable to a first condition in response to a signal indication from said signal means and operable to a second condition upon the subsequent passage of an area on said input device to which said data is to be stored.

References Cited in the file of this patent

UNITED STATES PATENTS

| | | |
|---|---|---|
| 2,702,380 | Brustman | Feb. 15, 1955 |
| 2,951,234 | Spielberg | Aug. 30, 1960 |
| 2,995,729 | Steele | Aug. 8, 1961 |